(12) United States Patent
Maugard

(10) Patent No.: US 7,841,099 B2
(45) Date of Patent: Nov. 30, 2010

(54) DEVICE FORMING A SIGHT-VANE FOR THREE-DIMENSIONAL MEASURING MACHINE

(76) Inventor: Michel Maugard, 4 avenue du Languedoc, Perpignan (FR) F-66000

( * ) Notice: Subject to any disclaimer, the term of this patent is extended or adjusted under 35 U.S.C. 154(b) by 124 days.

(21) Appl. No.: 12/304,201

(22) PCT Filed: Jun. 13, 2007

(86) PCT No.: PCT/FR2007/000972
§ 371 (c)(1),
(2), (4) Date: Dec. 10, 2008

(87) PCT Pub. No.: WO2008/000926
PCT Pub. Date: Jan. 3, 2008

(65) Prior Publication Data
US 2009/0199423 A1    Aug. 13, 2009

(30) Foreign Application Priority Data
Jun. 28, 2006 (FR) .................................. 06 06030

(51) Int. Cl.
*G01B 3/30* (2006.01)
(52) U.S. Cl. .............................. 33/520; 33/502; 33/613
(58) Field of Classification Search .................... 33/502, 33/503, 520, 613, 644
See application file for complete search history.

(56) References Cited

U.S. PATENT DOCUMENTS

| | | | | |
|---|---|---|---|---|
| 1,445,277 A | | 2/1923 | Hansen | |
| 2,419,134 A | * | 4/1947 | Hall | 33/520 |
| 3,026,621 A | * | 3/1962 | Papps et al. | 33/520 |
| 3,188,739 A | * | 6/1965 | Olsen et al. | 33/275 R |
| 4,509,269 A | * | 4/1985 | Leitz | 33/293 |
| 4,539,753 A | * | 9/1985 | Fitzpatrick | 33/520 |
| 5,179,788 A | * | 1/1993 | Jadach | 33/644 |
| 5,271,700 A | * | 12/1993 | Le Goff | 411/34 |
| 7,329,076 B2 | * | 2/2008 | Hartney et al. | 411/60.1 |

FOREIGN PATENT DOCUMENTS

| FR | 2 619 906 | | 3/1989 |
|---|---|---|---|
| GB | 1445277 A | * | 8/1973 |

OTHER PUBLICATIONS

International Search Report dated Sep. 26, 2007, in PCT application.

* cited by examiner

*Primary Examiner*—R. Alexander Smith
(74) *Attorney, Agent, or Firm*—Young & Thompson

(57) ABSTRACT

A device forming a sight-vane for a three-dimensional measuring machine. It includes a cylinder-shaped body (1), a thin part (5), and a tail (6). The part (5) and the tail (6) are provided with slots enabling the expansion or the withdrawal of the tail (6) in relation to the nominal diameter thereof. A contact face (2) is calibrated in relation to a bearing face (3). A cylinder (4) and the contact face (2) are calibrated and intended for the palpation. The exterior of the tail (6) is calibrated, the interior is provided with a conical (11) bore and the end thereof is provided with a wedge-shaped chamfer (13). The contact face (2) is provided with a countersink (9) and a threading (8) suitable for receiving an expansion screw (10) at the conical end. The device is useful as a palpation point for a measuring machine.

13 Claims, 1 Drawing Sheet

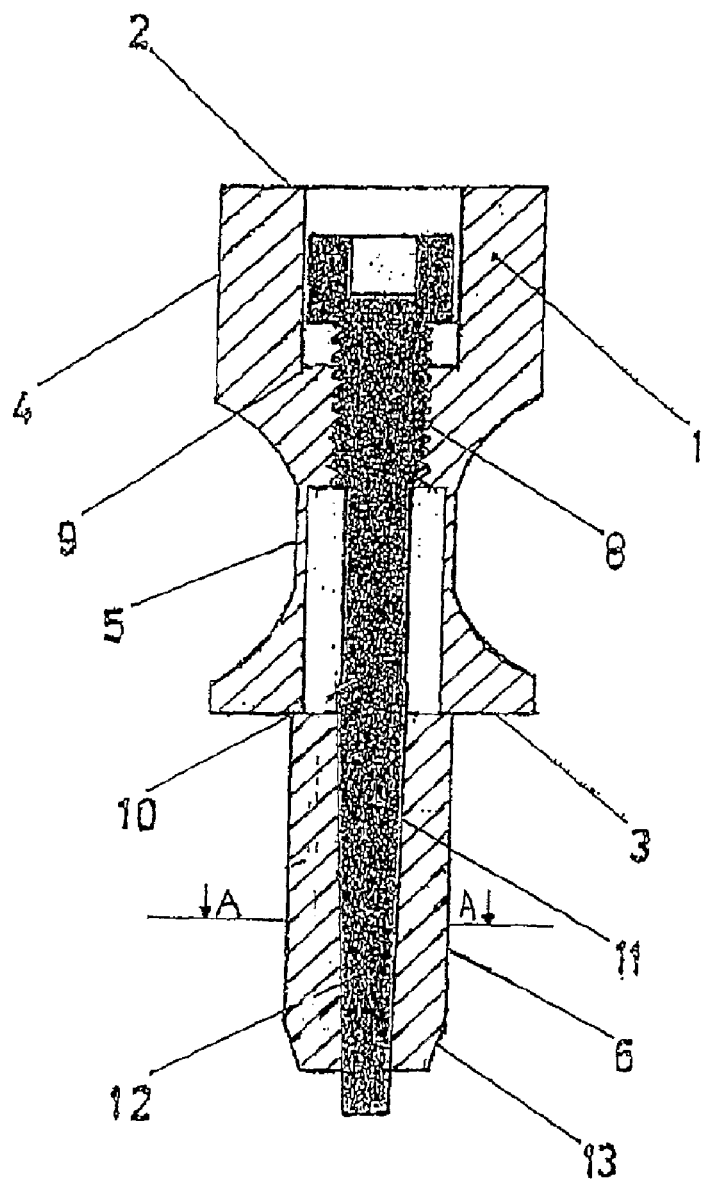
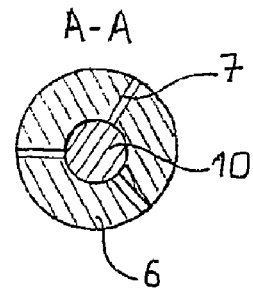
FIG. 1
FIG. 2
100 = 50

DEVICE FORMING A SIGHT-VANE FOR THREE-DIMENSIONAL MEASURING MACHINE

The present invention relates to a device forming a sight-vane for a three-dimensional measuring machine, especially used in a method for planning any tool, piece or assembly.

Such a device forming a sight-vane is also known by those skilled in measuring devices, as "palpation device" or "palpation sensor".

A device forming a sight-vane including a calibrated sphere for palpation, a non calibrated intermediate cylindrical part being fixedly attached to the calibrated sphere and having a positioning shoulder, and a cylindrical tail of a diameter suitable for sight-vane positioning on the tool, the machine piece, or the assembly to be measured by the measuring device, is already known—see for instance FR 2 619 906. The sphere is axially attached to the intermediate part by brazing or welding.

Such devices have a major disadvantage. In particular, a positive error of the machining of the bore to receive the device forming a sight-vane makes measuring uncertain because of the clearance existing between the bore diameter and the fixed diameter of the tail of the device forming a sight-vane.

Similarly, a negative error of the machining of the bore does not allow insertion of the device forming a sight-vane and it is necessary to re-bore accurately the hole designed to receive the device.

The objective of a device according to the present invention is to overcome these disadvantages.

Particularly, this invention proposes a device forming a sight-vane able to make accurate measurements, even in cases of errors of machining bores to receive the device forming a sight-vane.

The invention also proposes a device forming a sight-vane able to fit to different bore diameters and to make accurate measurements.

To this end, the invention relates to a device forming a sight-vane for a three-dimensional measuring machine, extending along a direction called longitudinal direction, comprising:
- a calibrated cylindrical part mounted on a longitudinal end of the device,
- a cylindrical tail for fitting the device forming a sight-vane on a machine piece to be measured, mounted on a longitudinal end of the device opposite to the said calibrated cylindrical part, and adapted to be received in a bore, called receiving bore, of the machine piece to be measured,
- a plane surface, called bearing surface, orthogonally to the said longitudinal direction, and suitable for coming into contact with the said machine piece to be measured once the cylindrical tail is received in the said receiving bore, wherein:
- a central bore extends longitudinally from one side to the other of the device forming a sight-vane and having at said cylindrical tail, a conical part,
- at least a slot in said tail, each slot being radically transverse, ending in said conical part of the said central bore, and extending longitudinally along a portion of said cylindrical tail, enabling a radial deformation of said cylindrical tail,
- an expansion screw having a conical part with the same conicity as the conical part of the said central bore, said expansion screw being received in the said central bore and adapted to move in a longitudinal direction in the central bore and thus enabling a radial expansion of said cylindrical tail in such a way that the assembly of said cylindrical tail and said receiving bore of the machine piece to be measured has no clearance.

Each slot of said cylindrical tail extends at least along a part of the cylindrical tail. Nevertheless, advantageously and according to the invention each slot extends completely along the cylindrical tail.

Advantageously and according to the invention said calibrated cylindrical part comprises a plane surface, called contact surface, intended to come into contact with said measuring machine, parallel to said bearing surface and placed at a preset distance therefrom.

In practice, the measuring machine comprises a palpation item.

Advantageously and according to the invention said central bore is at least partially threaded and the expansion screw has at least one exterior thread linked to the thread of said central bore.

Advantageously and according to the invention said expansion screw comprises a screw head having an impress suitable for receiving a tool in such a manner that an operator can operate the screw by means of a screw tool and ensure blocking of the device forming a sight-vane inside said receiving bore.

Advantageously and according to the invention the said cylindrical assembly tail has a beveled edge at its free end so that it can be more easily received in said receiving bore.

Advantageously and according to the invention said calibrated cylindrical part comprises a countersink for receiving said screw head and having a bottom shoulder against which the said screw head stops when the maximum tolerable expansion of the tail is reached.

This stop avoids breaking of the tail when it is too strongly fixed.

Advantageously and according to the invention said calibrated cylindrical part and said cylindrical tail are concentric.

Advantageously a device according to the invention comprises at least two radically transverse slots, extending longitudinally along a part of said cylindrical tail and ending in said conical part of said central bore enabling a radial deformation of said cylindrical tail.

Advantageously and according to the invention the calibrated cylindrical part and said cylindrical tail are integrally made.

Advantageously a device according to the invention comprises:
- an intermediate thin part between the calibrated cylindrical part and said bearing surface,
- at least three radial transverse slots, extending longitudinally along said cylindrical tail and intermediate part ending in said conical part of said central bore enabling a radial deformation of said cylindrical tail and the said intermediate part.

In a variant of the invention, the device comprises a cylindrical single body entirely perforated. The first part is intended for palpation, which is carried out in the calibrated cylinder having the same diameter as a calibrated sphere, and also in the superior part in relation to the bearing surface. The center of this first part is provided with a countersink and a threading receiving the expansion screw of the device forming a sight-vane.

In a variant of the invention, the intermediate part is not calibrated on its outer diameter. It has a shoulder used as a bearing surface for positioning. The intermediate thin part is provided with radically transverse slots which enable its expansion or withdrawal, the expansion screw having room to move in the interior.

The handle suitable for positioning the device forming a sight-vane is calibrated, and is also provided with slots in prolongation of the intermediate part for its expansion and withdrawal, the interior has a conical bore, its end is provided with a beveled chamfer in order to facilitate entering of a tight receiving bore.

A screw of the same conicity as the interior of the tail moving freely through the intermediate part enables expansion of the tail's diameter when fixed by the operator, which in turn avoids clearance between the error bore and the nominal diameter of the tail.

The device forming a sight-vane enables positive as well negative bore error compensating on the machine to be measured in relation to a nominal side, given that the tail, which enables the device's positioning on the machine to be measured, is expandable and can be withdrawn in relation to the nominal diameter.

In a variant of the invention, a countersink in the center of the superior part is adapted to receive the screw head and to block it in such a manner that palpation operations can be made smoothly, and the tail's diameter expansion is restricted so as to avoid breaking as a consequence of excessive fixing by the operator, the screw head then stops at the bottom of the countersink.

The device according to the invention can be obtained using special stainless steel, combining hardness and elasticity after tempering and mechanical working.

The invention provides moreover a device forming a sight-vane characterized in combination by all or some of the above and below characteristics.

Other characteristics, goals and advantages of the invention will be described in the following description which presents as a non restrictive example an embodiment of the invention with reference to the annexed drawings; on which:

FIG. 1 is a schematic sectional view of a device forming a sight-vane according to an embodiment of the invention, FIG. 2 is a schematic view in A-A section of the device presented in FIG. 1.

With reference to the figures, the device comprises an entirely cylindrical main body 1 integrally made. According to other embodiments there is no problem to use a cylindrical body made from several distinct pieces assembled together.

According to the embodiment of the figures, body 1 has a calibrated surface, called contact surface 2, a bearing surface 3, parallel to the calibrated surface, a calibrated cylinder 4, a countersink 9 and a thread 8 adapted for receiving a screw 10.

According to another embodiment of this device, body 1 has no thread and the expansion screw 10, not threaded, is adapted for moving into the central bore of the body 1 by a spring mechanism received in the countersink 9.

An intermediate part 5 and a cylindrical tail 6 have at least one transverse radial slot and extend longitudinally along said cylindrical tail, so as to enable a radial deformation of said cylindrical tail. These slots permit expansion or withdrawal of the tail's diameter 6 in relation to its nominal diameter. This intermediate part 5 is thin and provided with a shoulder forming the bearing face 3 for positioning.

According to an advantageous embodiment of this invention, the cylindrical tail 6 has three slots 7 separated from each other in an angle of 120 degrees. Nevertheless, there is no restriction in using a different number of slots or an irregular distribution.

The tail 6 which serves for positioning the device forming a sight-vane is calibrated on its outer diameter, it has an inner cone 11, and on its end, a beveled chamfer 13 to facilitate fitting of the handle in a tight bore.

A screw 10 has on its end a cone 12 of the same conicity as cone II of the interior of tail 6, the thread being concerted with the thread of body 1, its head being received inside the countersink 9 so that palpation is carried out smoothly, and the screw can freely pass through intermediate part 5, its head stops at the end of the countersink, the maximal authorized expansion being obtained in such a way that breaking of the tail 6 is avoided when being fixed by an operator.

During the installation of a device on a bore out of tolerance after fixing of the screw 10, expansion occurs and eliminates clearance, with a perfect concentricity between bore and cylinder 4 reserved for palpation, which makes it possible to take accurate measurements.

The embodiment of this invention is not limited to the one described. The forms, sizes and arrangements of different elements may change within the limits of equivalents, as well as construction materials, with no alteration in the general concept of the described invention.

The invention claimed is:

1. Device forming a sight-vane for three-dimensional measuring machine, extending along one direction, called longitudinal direction, comprising:
   a calibrated cylindrical part mounted on a longitudinal end of the device forming a sight-vane,
   a cylindrical tail for fitting the device forming a sight-vane on the machine piece to be measured, mounted on a longitudinal end of the device opposite to the said calibrated cylindrical part, and adapted to be received in a bore, called receiving bore, on machine piece to be measured,
   a plane surface, called bearing surface, orthogonally to the said longitudinal direction, and suitable for coming into contact with the said machine piece to be measured once the cylindrical tail is received in said receiving bore, wherein:
   a central bore extending longitudinally from one side to the other of the device forming a sight-vane and having at the said cylindrical tail a conical part,
   at least a slot in said tail, each slot being radially transverse, ending in said conical part of said central bore, and extending longitudinally along a portion of said cylindrical tail, enabling a radial deformation of said cylindrical tail,
   an expansion screw having a conical part with the same conicity as the conical part of the said central bore, said expansion screw being received in said central bore and adapted to move in a longitudinal direction in the central bore and thus enabling a radial expansion of said cylindrical tail in such a way that the assembly of said cylindrical tail and said receiving bore of the machine piece to be measured has no clearance.

2. Device as claimed in claim 1, wherein said calibrated cylindrical part comprises a plane surface, called contact surface, intended to come into contact with said measuring machine, parallel to said bearing surface and placed at a preset distance therefrom.

3. Device as claimed in claim 2, wherein said central bore is at least partially threaded and the expansion screw has at least one exterior thread linked to the thread of the central bore.

4. Device as claimed in claim 2, wherein said expansion screw comprises a screw head having an impress suitable for receiving a tool in such a manner that an operator can operate the screw by means of a screw's tool and ensure blocking of the device forming a sight-vane inside said receiving bore.

5. Device as claimed in claim 1, wherein said central bore is at least partially threaded and the expansion screw has at least one exterior thread linked to the thread of the central bore.

6. Device as claimed in claim 5, wherein said expansion screw comprises a screw head having an impress suitable for receiving a tool in such a manner that an operator can operate the screw by means of a screw's tool and ensure blocking of the device forming a sight-vane inside said receiving bore.

7. Device as claimed in claim 1, wherein said expansion screw comprises a screw head having an impress suitable for receiving a tool in such a manner that an operator can operate the screw by means of a screw's tool and ensure blocking of the device forming a sight-vane inside said receiving bore.

8. Device as claimed in claim 1, wherein said cylindrical assembly tail has a chamfer at its free end so that it can be more easily received in said receiving bore.

9. Device as claimed in claim 8, wherein said calibrated cylindrical part has a countersink adapted for receiving a screw head and having a bottom shoulder against which the said screw head stops when the maximum tolerable expansion of the tail is reached.

10. Device as claimed in claim 1, wherein said calibrated cylindrical part and said cylindrical tail are concentric.

11. Device as claimed in claim 1, wherein it comprises at least two radially transverse slots, extending longitudinally along a part of said cylindrical tail and ending in said conical part of said central bore enabling a radial deformation of said cylindrical tail.

12. Device as claimed in claim 1, wherein the calibrated cylindrical part and said cylindrical tail are integrally made.

13. Device as claimed in claim 1, wherein the device comprises:
- an intermediate thin part between the calibrated cylindrical part and said bearing surface,
- at least three radial transverse slots extending longitudinally along said cylindrical tail and said intermediate part and ending in the said conical part of said central bore enabling a radial deformation of said cylindrical tail and said intermediate part.

* * * * *